D. W. HAWKSWORTH.
CAR ROOF.
APPLICATION FILED AUG. 30, 1918.
1,385,616.
Patented July 26, 1921.
2 SHEETS—SHEET 1.
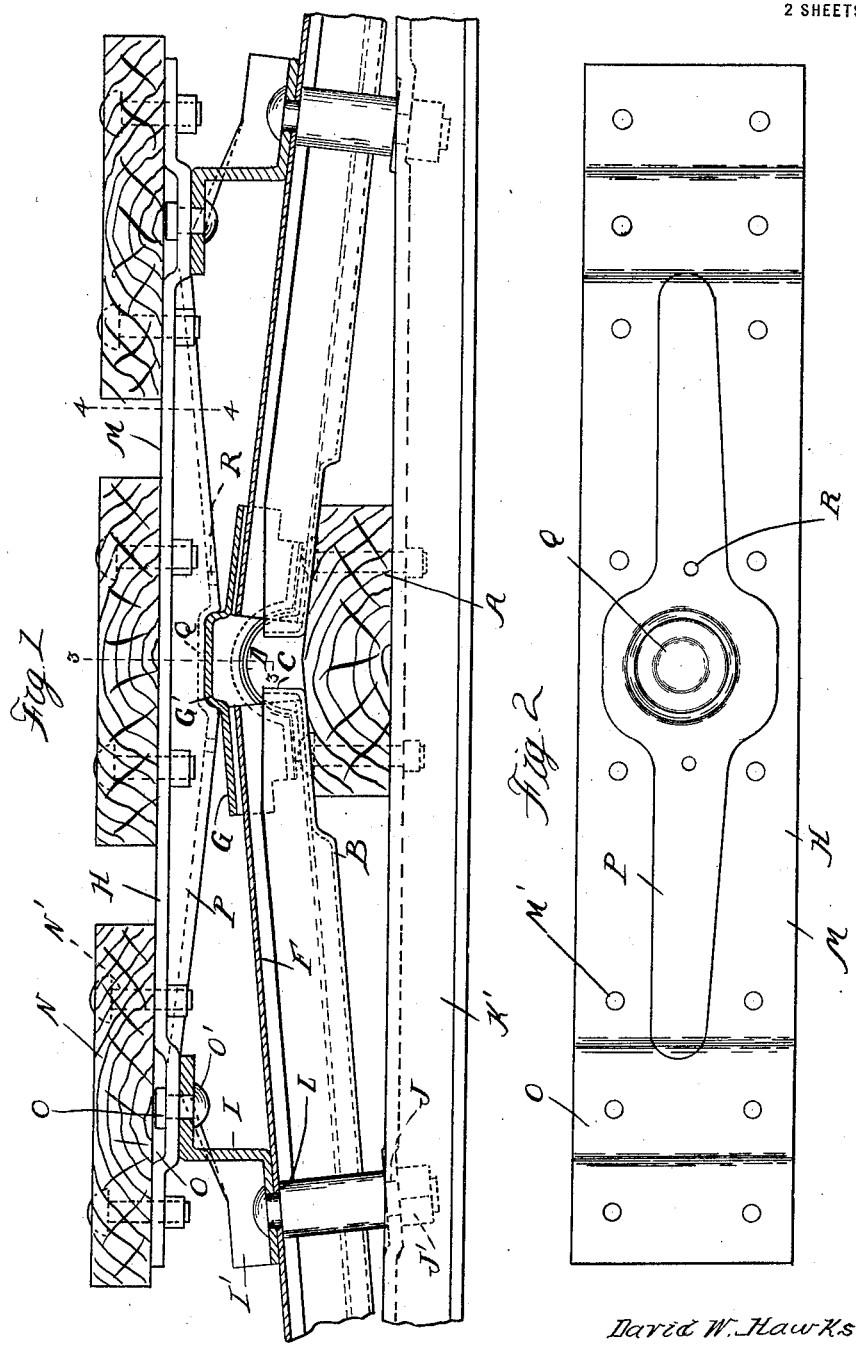
Inventor
David W. Hawksworth

D. W. HAWKSWORTH.
CAR ROOF.
APPLICATION FILED AUG. 30, 1918.

1,385,616.

Patented July 26, 1921.
2 SHEETS—SHEET 2.

Inventor
David W. Hawksworth

By Whittemore Hulbert & Whittemore,
Attorneys

UNITED STATES PATENT OFFICE.

DAVID W. HAWKSWORTH, OF DETROIT, MICHIGAN, ASSIGNOR TO HUTCHINS CAR ROOFING COMPANY, OF DETROIT, MICHIGAN, A CORPORATION OF MICHIGAN.

CAR-ROOF.

1,385,616.     Specification of Letters Patent.     Patented July 26, 1921.

Application filed August 30, 1918. Serial No. 252,000.

*To all whom it may concern:*

Be it known that I, DAVID W. HAWKSWORTH, a citizen of the United States of America, residing at Detroit, in the county of Wayne and State of Michigan, have invented certain new and useful Improvements in Car-Roofs, of which the following is a specification, reference being had therein to the accompanying drawings.

The invention relates to car roofs of that type in which the roofing sheets are weather-proofed by carline and ridge caps, which in turn are weather-proofed by junction caps. The present invention comprises the peculiar construction of a running board saddle as more fully hereinafter set forth. Another feature comprises the means for securing the saddle to the car roof.

In the drawings:

Figure 1 is a sectional view through a portion of a car roof embodying my invention;

Fig. 2 is a plan view of the running board saddle;

A is the ridge purlin, B are the roofing sheets having the upstanding flanges C at the ridge which are covered by the carline caps F. G is a junction cap adapted to fit over the adjacent ends of the carline caps F and the ridge caps D to weather-proof the roof.

H is the running board saddle arranged in the plane of the carline caps and supported at its opposite ends by the Z-shaped brackets I formed of pressed sheet metal and having the reinforcing side flanges I'. The shoulder bolts J extending at right angles to the base flanges of the brackets I and the inclined shoulders of the carlines K' and engaged at their lower ends by the nuts J' secure the brackets rigidly in place. The caps and the carlines are maintained in fixed spaced relation by the shoulders L upon the bolts J. The running board saddle is pressed from sheet metal to form a plane surface portion for supporting the running boards and a cap portion for resting upon and holding in place the junction cap.

In detail, the running board saddle H has the horizontally-extending portion M forming a plane surface for supporting the running boards N, the apertures M' being provided near opposite sides of this portion for the passage of the bolts N' for securing the running boards. Near opposite ends of the saddle the horizontally-extending portion M is provided with the transversely-extending depressed channels O, through the base of which pass the rivets O' or any other suitable means for securing the saddle to the brackets I, sufficient space being provided between the upper face of the channels and the lower face of the running boards for the heads $O^2$ upon the rivets. The running board saddle is provided with the depressed downwardly inclined ribs P extending longitudinally centrally inward and terminating in the centrally located depressed cap portion Q adapted to fit upon the upwardly extending portion G' of the junction cap G.

The running board saddle rests upon and securely holds the junction cap in place, which in turn maintains the ridge and carline caps and the roofing sheets in engagement. Furthermore, the saddle is of light construction and is inexpensive to manufacture.

The bottoms of the depressed ribs P have the apertures R therein near the cap portion Q for the passage of any moisture or other material out of the ribs.

Figure 3:
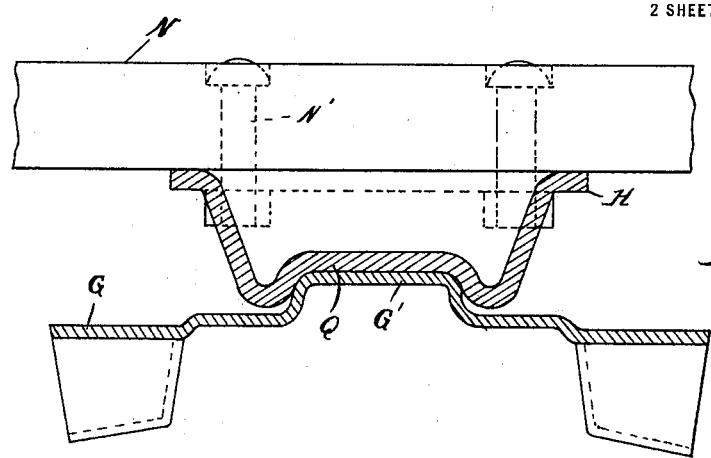
Fig. 3 is a sectional view on line 3—3 of Fig. 1.
Figure 5:
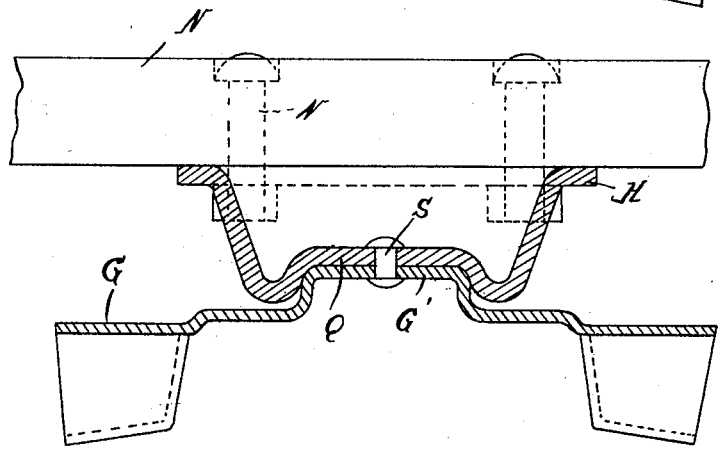
Fig. 5 is a sectional view showing a modified construction.
Figure 4:
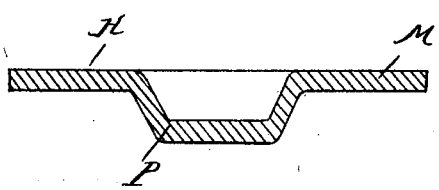
Fig. 4 is a sectional view on line 4—4 of Fig. 2.

As shown in Fig. 5, the arrangement of the junction cap G and the running board saddle H is the same as that shown in Figs. 1, 3 and 4 with the exception that the junction cap is secured to the saddle in any suitable manner, as by the rivet S passing centrally through the upwardly-extending portion G' of the junction cap and the depressed cap portion Q of the saddle. With this construction the junction cap and running board saddle can be assembled in the car roof as a unit.

What I claim as my invention, is:

1. In a car roof having a weather-proof cap, a running-board saddle secured to said car roof only beyond said cap and provided with means engaging said cap for retaining the same in place.

2. In a car roof having a weather-proof cap, a running-board saddle secured to said car roof only at its opposite ends and provided with an intermediate cap portion engaging said weather-proof cap for retaining the same in place.

3. In a car roof, having roofing sheets, carline and ridge caps for weather-proofing the edges thereof, the combination with a member retaining said caps and sheets in engagement, of a running-board saddle secured only at opposite ends to said car roof and provided with a portion engaging said member and adapted to retain the same in place.

4. In a car roof, the combination with a running-board saddle formed of pressed sheet-metal, having an integral cap portion for fitting upon the junction cap of the car roof, and means for securing said saddle to the car roof.

5. In a car roof, a saddle formed of pressed sheet-metal having a depressed longitudinally-extending rib and a depressed central cap portion for fitting upon the junction cap of the car roof, and brackets near the ends of said saddle for securing the latter to the car roof.

6. In a car roof, a saddle formed of pressed sheet metal comprising a horizontally-extending plane surface portion, depressed ribs extending longitudinally inward, and a depressed centrally located cap portion for fitting upon the junction cap of the car roof.

7. In a car roof, a saddle formed of pressed sheet metal comprising a horizontally-extending plane surface portion, depressed ribs extending longitudinally inward and provided with apertures, and a depressed centrally located cap portion for fitting upon the junction cap of the car roof.

8. In a car roof, the combination with a junction cap, of a running board saddle, interfitting portions upon said cap and saddle, and means for securing said cap to said saddle to form a unit construction attachable to the car roof.

9. In a car roof, the combination with a junction cap having an outwardly projecting portion, of a running board saddle having a cap portion fitting said projecting portion, and means for permanently securing said cap to said saddle to form a unit construction attachable to the car roof.

10. In a car roof, the combination with a running board saddle, comprising a horizontally extending plane surface portion, depressed longitudinally extending ribs, a centrally located depressed cap portion, and depressed portions near opposite ends of the saddle, of headed members extending through the bases of said depressed portions for securing the saddle to the car roof.

11. In a car roof, the combination with brackets, of a running board saddle comprising a horizontally extending plane surface portion, depressed longitudinally extending ribs, a centrally located depressed cap portion, and transversely extending depressed portions near opposite ends of the saddle, and headed members extending through the bases of the depressed portions for securing the saddle to the brackets.

12. In a car roof, the combination with reinforced brackets formed of pressed sheet metal, of a running board saddle formed of pressed sheet metal, comprising a horizontally extending plane surface portion, depressed longitudinally extending ribs, a centrally located depressed cap portion, and depressed channels near opposite ends of the saddle, and headed members extending through the bases of the depressed channels for securing the saddle to the brackets.

In testimony whereof I affix my signature.

DAVID W. HAWKSWORTH.